United States Patent [19]

Taniji

[11] Patent Number: 5,485,204
[45] Date of Patent: Jan. 16, 1996

[54] SOLID STATE IMAGE SENSOR AND IMAGING METHOD USING SPATIAL PIXEL OFFSET

[75] Inventor: Yukio Taniji, Tokyo, Japan

[73] Assignee: NEC Corporation, Tokyo, Japan

[21] Appl. No.: 284,203

[22] Filed: Aug. 2, 1994

[30] Foreign Application Priority Data

Aug. 2, 1993 [JP] Japan .................... 5-191053

[51] Int. Cl.⁶ .................................. H04N 9/04
[52] U.S. Cl. ............... 348/264; 348/238; 348/283
[58] Field of Search ...................... 348/253, 268, 348/262, 263, 265, 264, 234, 238, 281, 282, 283; H04N 9/04

[56]. References Cited

U.S. PATENT DOCUMENTS

| | | | |
|---|---|---|---|
| 4,541,010 | 9/1985 | Alston | 348/283 |
| 4,761,682 | 8/1988 | Asaida | 348/265 |
| 4,876,590 | 10/1989 | Parulski | 348/281 |
| 5,374,955 | 12/1994 | Faruhata et al. | 348/234 |

FOREIGN PATENT DOCUMENTS 61-184076  8/1986  Japan ................ H04N 9/04

OTHER PUBLICATIONS

Ohtake et al., "Pre-Processing CCD Camera", ITEJ Technical Report vol. 15, No. 62, Oct. 1991, pp. 1–6.

Primary Examiner—James J. Groody
Assistant Examiner—Jeffrey S. Murrell
Attorney, Agent, or Firm—Foley & Lardner

[57] ABSTRACT

A solid state image sensor and an imaging method using a spatial pixel offset, in which in each field, charges of pixels of solid state imaging devices for green color and red/blue colors are separately summed and mass center of the summed charges for the green color is made to be coincident with that for the red/blue colors, enabling to form an aperture form without degrading resolution and to improve sensitivity and dynamic range without resolution drop.

8 Claims, 9 Drawing Sheets

FIRST FIELD

SECOND FIELD

FIG. 6C

THIRD FIELD

| G | R/B | G | R/B | G | R/B |
|---|-----|---|-----|---|-----|
| G | R/B | G | R/B | G | R/B |
| G | R/B | G | R/B | G | R/B |
| G | R/B | G | R/B | G | R/B |
| G | R/B | G | R/B | G | R/B |
| G | R/B | G | R/B | G | R/B |

FIG. 6D

FOURTH FIELD

| G | R/B | G | R/B | G | R/B |
|---|-----|---|-----|---|-----|
| G | R/B | G | R/B | G | R/B |
| G | R/B | G | R/B | G | R/B |
| G | R/B | G | R/B | G | R/B |
| G | R/B | G | R/B | G | R/B |
| G | R/B | G | R/B | G | R/B |

SOLID STATE IMAGE SENSOR AND IMAGING METHOD USING SPATIAL PIXEL OFFSET

BACKGROUND OF THE INVENTION

The present invention relates to a solid state image sensor and an imaging method which are capable of obtaining high sensitivity and wide dynamic range of a three plate color camera using spatial pixel offset.

DESCRIPTION OF THE RELATED ARTS

With development in a semiconductor microprocessing techniques, the pixel number of a solid state imaging device rapidly increases. However, reduction of an area per one pixel due to the pixel number increase brings about degradation of sensitivity. Accordingly, some proper measures have been taken. For example, the conversion gain of an on-chip amplifier is improved, or an apparent opening rate is improved by providing an on-chip microlens 10 on a photo diode 11, as shown in FIG. 1 wherein numerals 18, 19, 20 and 23 denote a channel stop, a light shielding film, a vertical transfer register and a vertical transfer register electrode, respectively.

Further, in a conventional image sensor, as shown in FIG. 2A, signal charges output from photo diodes 11 aligned in a matrix are transferred by vertical transfer registers 20 and are then summed up by horizontal transfer registers 12, or, as shown in FIG. 2B, combinations for adding the charges of the adjacent two of the photo diodes 11 aligned in a matrix using the vertical transfer registers 20 and the horizontal transfer registers 12 are varied every field, four fields (1), (2), (3) and (4) constituting all sampling point for each photo diode 11, so as to improve the sensitivity and dynamic range of CCD cameras, as disclosed in "Pre-Processing CCD Camera", Ohtake et al., ITEJ Technical Report Vol. 15, NO. 62, pp. 1–6, IPU'91-55, October, 1991. In the latter case, the summing is carried out simply in the horizontal direction and thus all the photo diodes 11 are driven in the same manner regardless of their colors to detect. Hence, the mass center obtained by the summing the charges of a green color is not coincident with that of a red or blue color and is offset from the same.

On the other hand, as a color camera for broadcasting services, as shown in FIG. 3A, a three plate type is solely used, in which the light passing through a lens 14 is color-separated by a prism 16 into three primary colors such as red (R), blue (B) and green (G) corresponding to three solid state imaging devices 15 for detecting the three color lights Further, in order to improve the horizontal resolution, as shown in FIG. 3B, a spatial pixel offset method is usually employed, wherein photo diodes 17 of the solid state imaging devices for the green and red/blue colors are spatially offset from each other to increase sampling points.

In the case shown in FIG. 2B, the four fields constitute one screen and the charges output from the photo diodes are summed simply in the horizontal direction, that is, each addition is executed so that the mass center may be offset. Moreover, the photo diodes for the green color and the red/blue colors are controlled to carry out the same driving.

When the spatial pixel offset is performed, the opening rate (d/a×100%) of the conventional on-chip microlens shown in FIG. 1 turns out a 100% equivalence at 50% and its MTF (modulation transfer function) is obtained, as shown by (a) in FIGS. 4A and 4B. In this case, even in the Nyquist frequency $f_N$ which is twice as much as the maximum frequency contained in the original signal, approximately 63% modulation is obtained and an optical low pass filter having the zero point in the Nyquist frequency $f_N$ for suppressing aliasing noise is used in combination. Hence, at 100% equivalent to 200% of the opening rate of the on-chip microlens, substantially no large difference arises in the MTF and at this time, the MTF is obtained, as shown by (b) in FIGS. 4A and 4B. However, since the on-chip microlens is manufactured using a semiconductor patterning technique, its minimum dimension is restricted and an invalid area indicated by b in FIG. 1 necessarily occurs. Furthermore, when the opening rate is raised, the influence of lens aberration cannot be ignored and sensitivity drop due to eclipse is also caused. As a result, it is hardly possible to attain nearly twice sensitivity.

On the other hand, in the case of summing of the pixels simply in the horizontal direction, as shown in FIGS. 2A and 2B, the modulation turns to zero at a frequency $f_N/2$ and the effect of the spatial pixel offset can by no means usefully be employed. Hence, the resolution is remarkably dropped.

SUMMARY OF THE INVENTION

It is therefore an object of the present invention to provide a solid state image sensor in view of the aforementioned problems of the prior art, which is capable of improving sensitivity and dynamic range without degrading resolution.

It is another object of the present invention to provide an imaging method which is capable of improving sensitivity and dynamic range without degrading resolution.

In accordance with one aspect of the present invention, there is provided a solid state image sensor, comprising a plurality of solid state imaging devices for green color and red/blue colors, arranged in a matrix: vertical transfers means for transferring charges output from the solid state imaging devices in a vertical direction; summing means for transferring the charges transferred from the vertical transfer means in a horizontal direction and summing the transferred charges; and control means for controlling timings of the transferring and the summing of the vertical transfer means and the summing means, the control means controlling the vertical transfer means and the summing means so that a first mass center as a sampling point obtained by summing the charges of the solid state imaging devices for the green color is made to be coincident with a second mass center obtained by summing the charges of the solid state imaging devices for the red/blue colors to obtain a luminance signal.

In accordance with another aspect of the present invention, there is provided an imaging method, comprising a photoelectric conversion step for detecting image information of an object to be imaged using a plurality of imaging devices for green color and red/blue colors, arranged in a matrix, to output a charge array of the imaging devices; vertical transfer step for transferring the charge array obtained in the photoelectric conversion step in a vertical direction; and :horizontal transfer summing step for transferring the charge array transferred from the vertical transfer means in a horizontal direction and summing the transferred charge array by the vertical transfer step and the horizontal transfer summing step, a first mass center as a sampling point, obtained by summing the charges of the solid state imaging devices for the green color being made to be coincident with a second mass center obtained by summing the charges of the solid state imaging devices for the red/blue colors to obtain a luminance signal.

BRIEF DESCRIPTION OF THE DRAWINGS

The objects, features and advantages of the present invention will become more apparent from the consideration of the following detailed description, taken in conjunction with the accompanying drawings, in which:

FIGS. 6A to 6D are schematic representations showing sampling patterns used in the solid state image sensor shown in FIG. 5;

DESCRIPTION OF THE PREFERRED EMBODIMENTS

Figure 1:
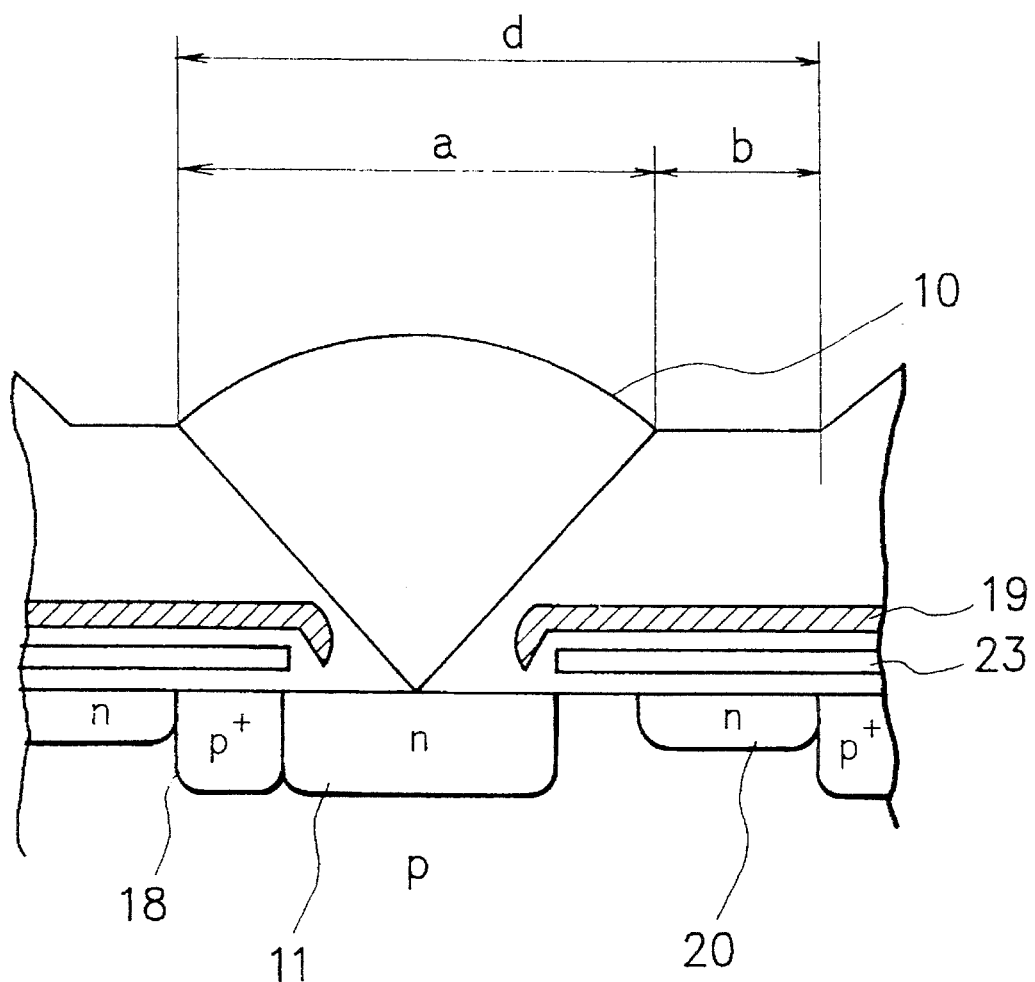
FIG. 1 is a cross sectional views of a conventional on-chip microlens.
Figure 2A:
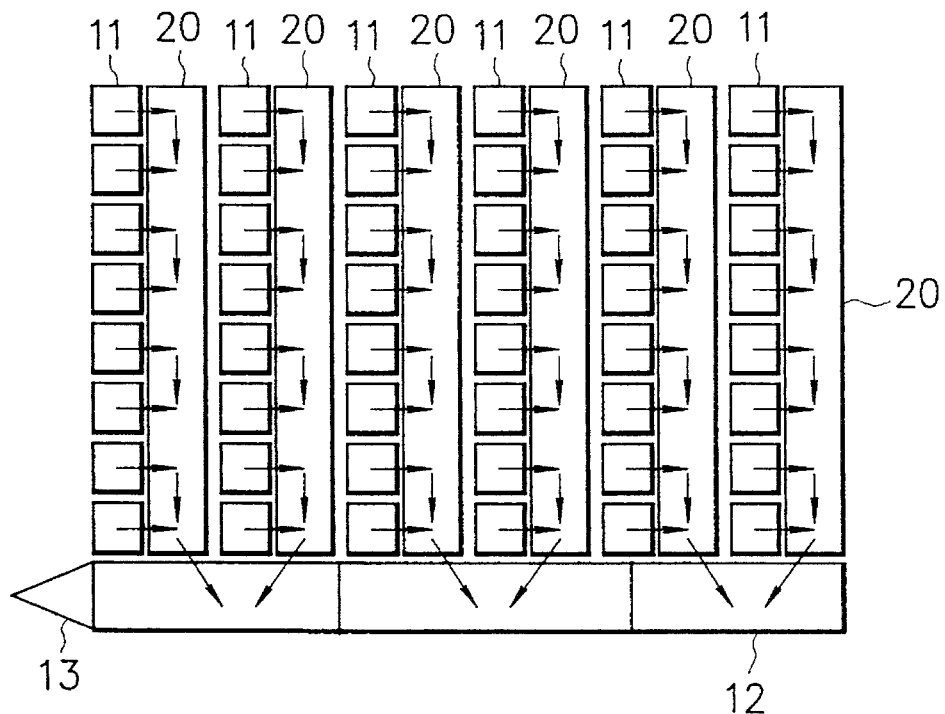
FIGS. 2A and 2B are schematic views showing a conventional image sensor and its summing system.
Figure 2B:
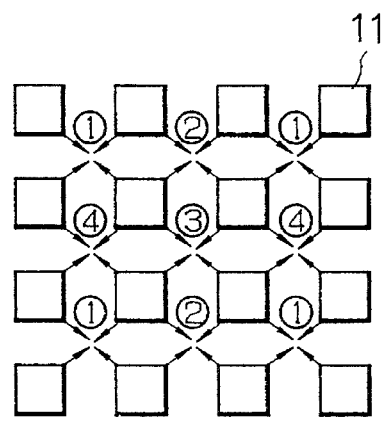
Figure 3A:
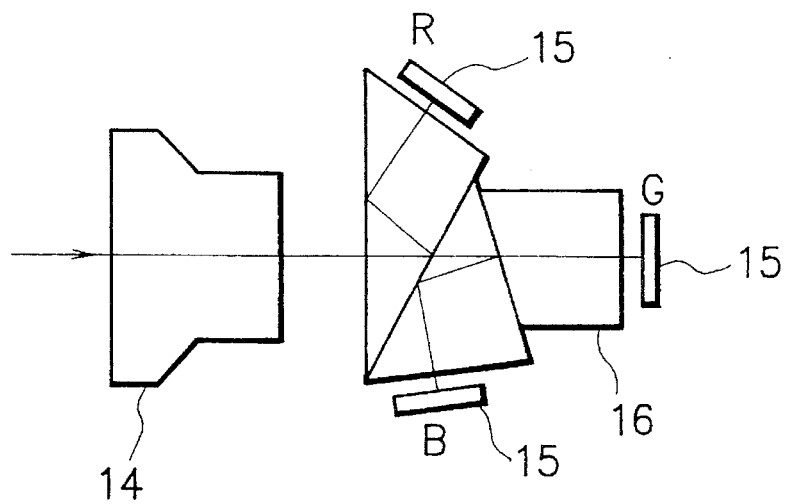
FIG. 3A is a schematic view showing a conventional three plate color camera and FIG. 3B is a schematic view showing a conventional pixel offset structure of the three plate color camera.
Figure 3B:
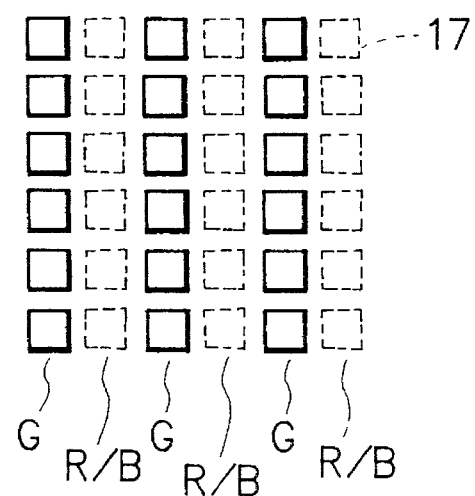

The present invention will now be described in connection with its preferred embodiments with reference to the accompanying drawings, wherein like reference characters designate like or:corresponding parts throughout the views and thus the repeated description thereof can be omitted for brevity.

Figure 5:
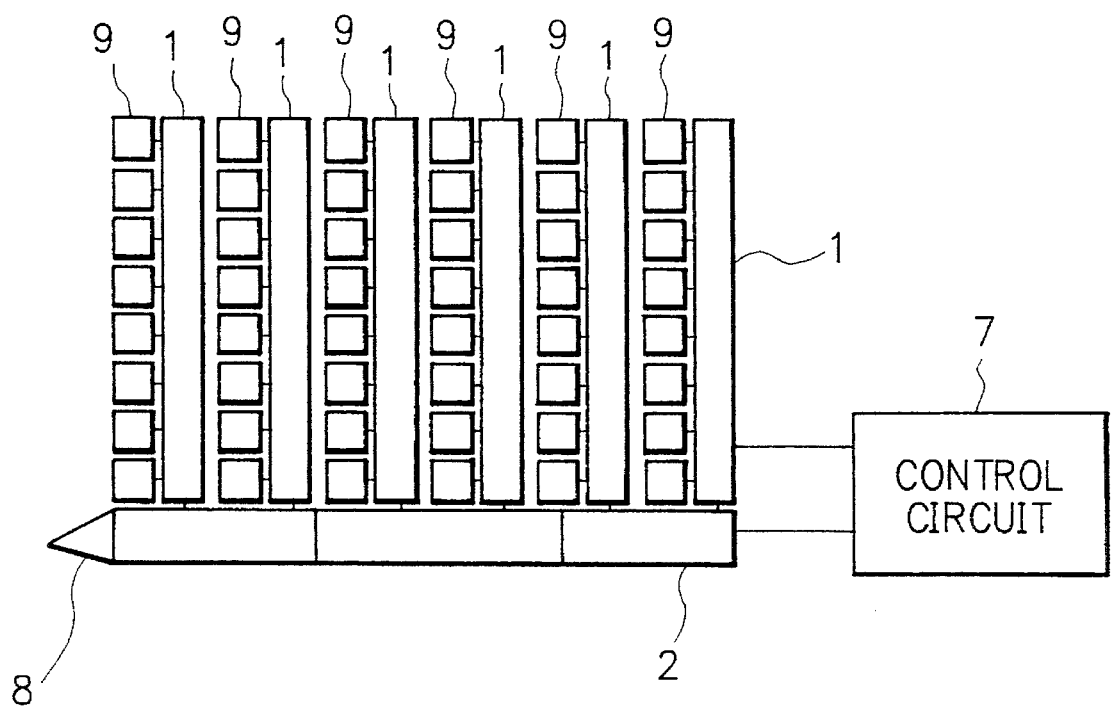
FIG. 5 is a schematic front view of one embodiment of a solid state image sensor according to the present invention.

In FIG. 5, there is shown one embodiment of a solid state image sensor according to the present invention. FIGS. 6A to 6D show sampling patterns of first to fourth fields used in the solid State image sensor shown in FIG. 5.

As shown in FIG. 5, in the solid state image sensor, a plurality of photo diodes 9 for the green color and the red/blue colors are aligned in a matrix. Vertical transfer registers 1 transfer charges output from the photo diodes 9 to horizontal transfer registers 2 for summing the charges transferred. An amplifier 8 outputs the summed charges. A drive controller 7 controls the drive of the vertical transfer registers 1 and the horizontal transfer registers 2. The photo diodes 9 for the green color are offset from the photo diodes 9 for the red/blue colors by the ½ pitch in the horizontal direction. In FIGS. 6A to 6D, the pixels surrounded by thick solid lines are summed.

Figure 6A:
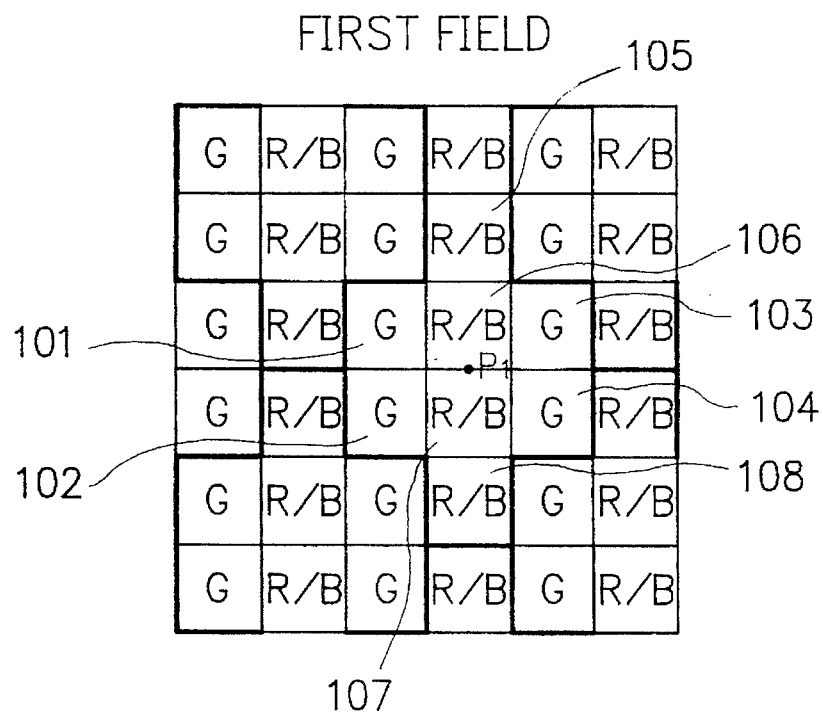

In the first field, as shown in FIG. 6A, the four pixels of the photo diodes 101, 102, 103 and 104 for the green color, that is, the central two aligned along the third column and the central two aligned along the fifth column are summed, and the four pixels of the photo diodes 105, 106, 107 and 108 for the red/blue colors, that is, the central four aligned along their fourth column are summed. The mass center of the summed photo diodes 101 to 104 for the green color is determined as follows: That is, a charge G101 (G represents the green color) of the photo diode 101 and a charge G102 of the photo diode 102 are transferred in the vertical direction by the vertical transfer registers 1 to obtain the mass center of these two charges and similarly a charge G103 of the photo diode 103 and a charge G104 of the photo diode 104 are transferred in the vertical direction to obtain the mass center of these two charges. Then, the obtained two mass centers of the charges G101 and G102 and of the charges G103 and G104 are transferred in the horizontal direction and are summed up by the horizontal transfer registers 2, thereby obtaining the mass center $P_1$ of the four charges G101 to G104 as a sampling point. The mass center $P_1$ as the sampling point turns to be better in the sensitivity. Next, the mass center of the summed photo diodes 105 to 108 for the red/blue colors is determined in the same manner as described above. That is, since all the four photo diodes 105 to 108 are aligned along the fourth column, four charges G105 to G108 of the summed photo diodes 105 to 108 are transferred in the vertical direction and it is understood that the mass center of the charges G105 to G108 is located in the same position as the mass center $P_1$ as the sampling point.

Figure 6B:
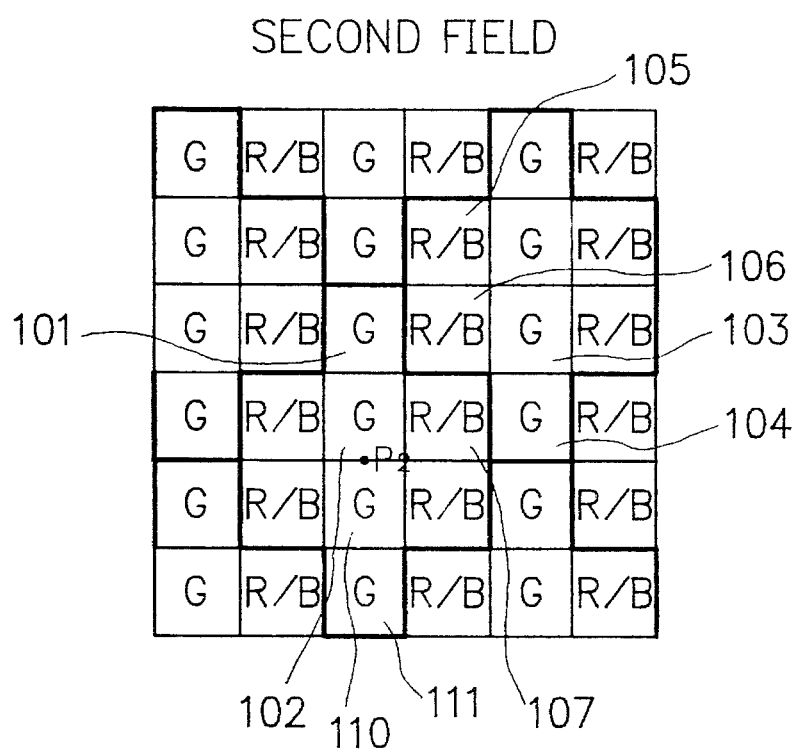

In the second field, as shown in FIG. 6B, on the contrary, four pixels of the photo diodes for the green color, aligned along one column are summed and four pixels of the photo diodes for the red/blue colors, two pairs aligned along every other column, that is, two columns with the column for the green color therebetween, are summed in the same manner as the first field. That is, the mass center $P_2$ of the summed photo diodes for the green color, which is coincident with that of the photo diodes for the red/blue colors is determined in the same manner as the first field.

In the third and fourth fields, as shown in FIGS. 6C and 6D, respectively, the summing of the pixels of the photo diodes surrounded by the thick solid lines is carried out and their respective mass centers $P_3$ and $P_4$ are determined in the same manner as the first and second field. The combination of the sampling points of the obtained mass centers $P_2$, $P_3$ and $P_4$ is different, as shown in FIGS. 6A to 6D. That is, as described above, the pixels of the photo diodes surrounded by the thick solid lines are summed. In other words, the four fields constitute one screen and the mass center $P_1$ obtained in the first field is offset from the mass center $P_2$ obtained in the second field by every ½ bit in the horizontal and vertical directions. Also, the mass center $P_1$ of the third field is offset from the mass center $P_4$ of the fourth field by every ½ bit in the horizontal and vertical directions. The mass centers $P_1$ $P_2$, $P_3$ and $P_4$ constitute a diamond-shaped sampling points forming one pixel.

Figure 4A:
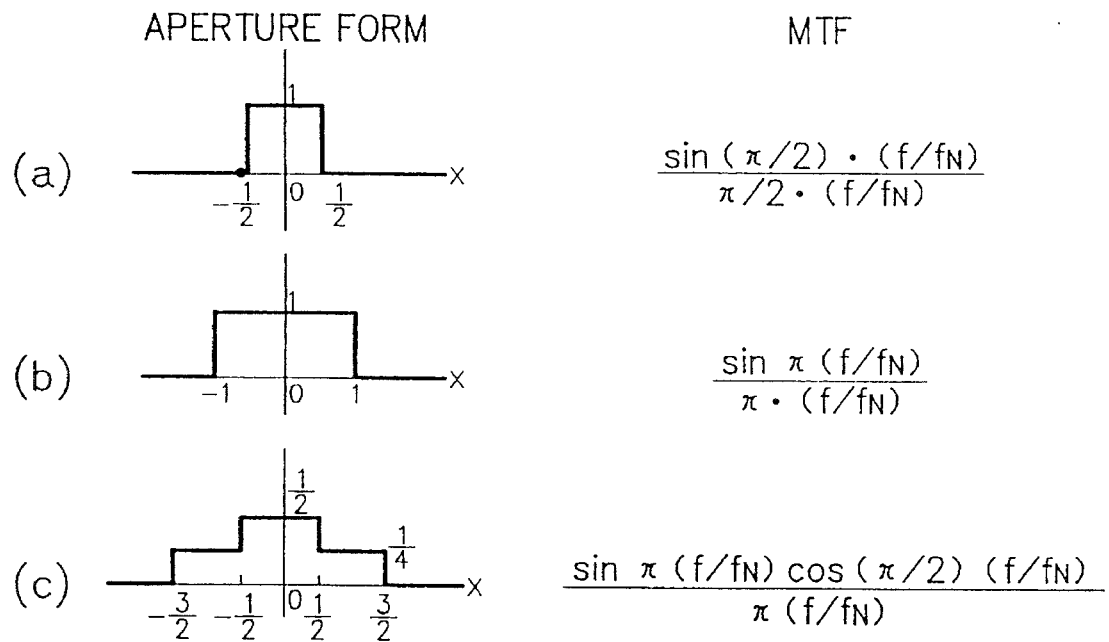
FIG. 4A is a timing chart showing aperture forms of an on-chip microlens and FIG. 4B is a graphical representation showing relationship between a modulation transfer function (MTF) and an opening rate of the microlens.
Figure 4B:
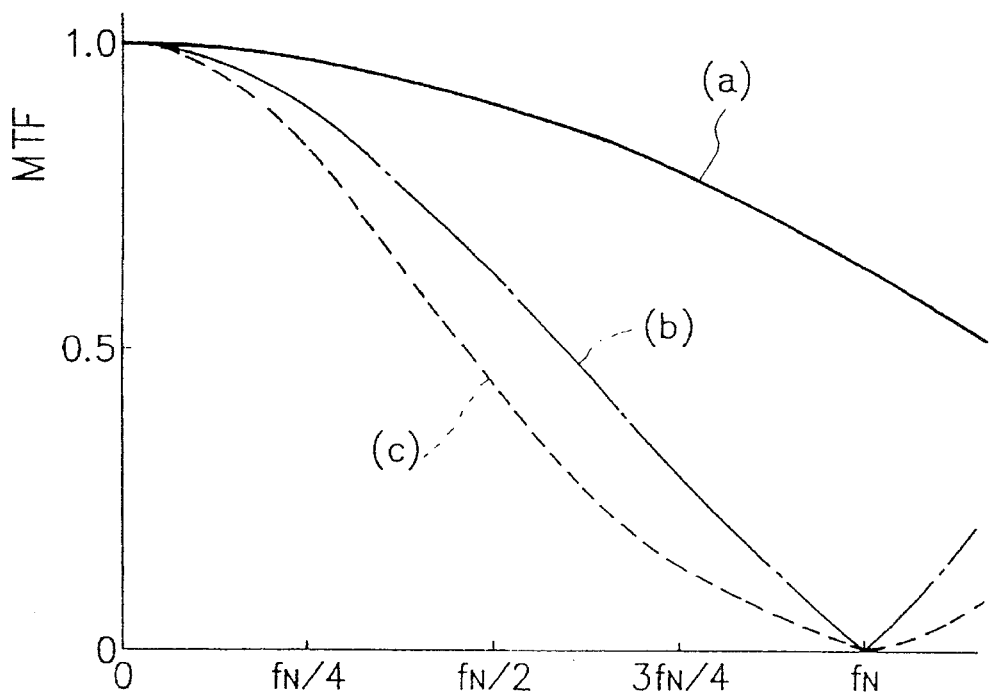

The charge G101 to be summed in the first field, as described above, is controlled by the drive controller 7 so as to be transferred in the horizontal and vertical directions and to be summed in order to obtain the mass center $P_1$ as the sampling point. Further, in the second field, the charge G101 is controlled so as to be transferred along with other charges G102, G110 and G111 only in the vertical direction in order to obtain the mass center $P_2$. As described above, in this embodiment, different from the conventional example, the transferring operation of the charges such as G101, G102, R/B105 and the like output from the photo diodes are different every field. Hence, the mass center of the summed pixels of each solid state imaging device and the same number of sampling points as the pixel number of the device in the four fields can be realized. At this time, at 50% of the opening rate of a single device, a substantial aperture shape in the horizontal direction is shown by (c) in FIG. 4A and its MTF is obtained by multiplying $\cos(\pi/2)(f/f_N)$ to that at 100% opening rate of (d) in FIG. 4A. This means that according to the present invention, the aperture height is ½ in comparison with those shown by (a) and (b) in FIG. 4A and even when the spatial pixel offset is performed, the sensitivity and dynamic range can be doubled with hardly degrading the limit resolution.

Figure 7:
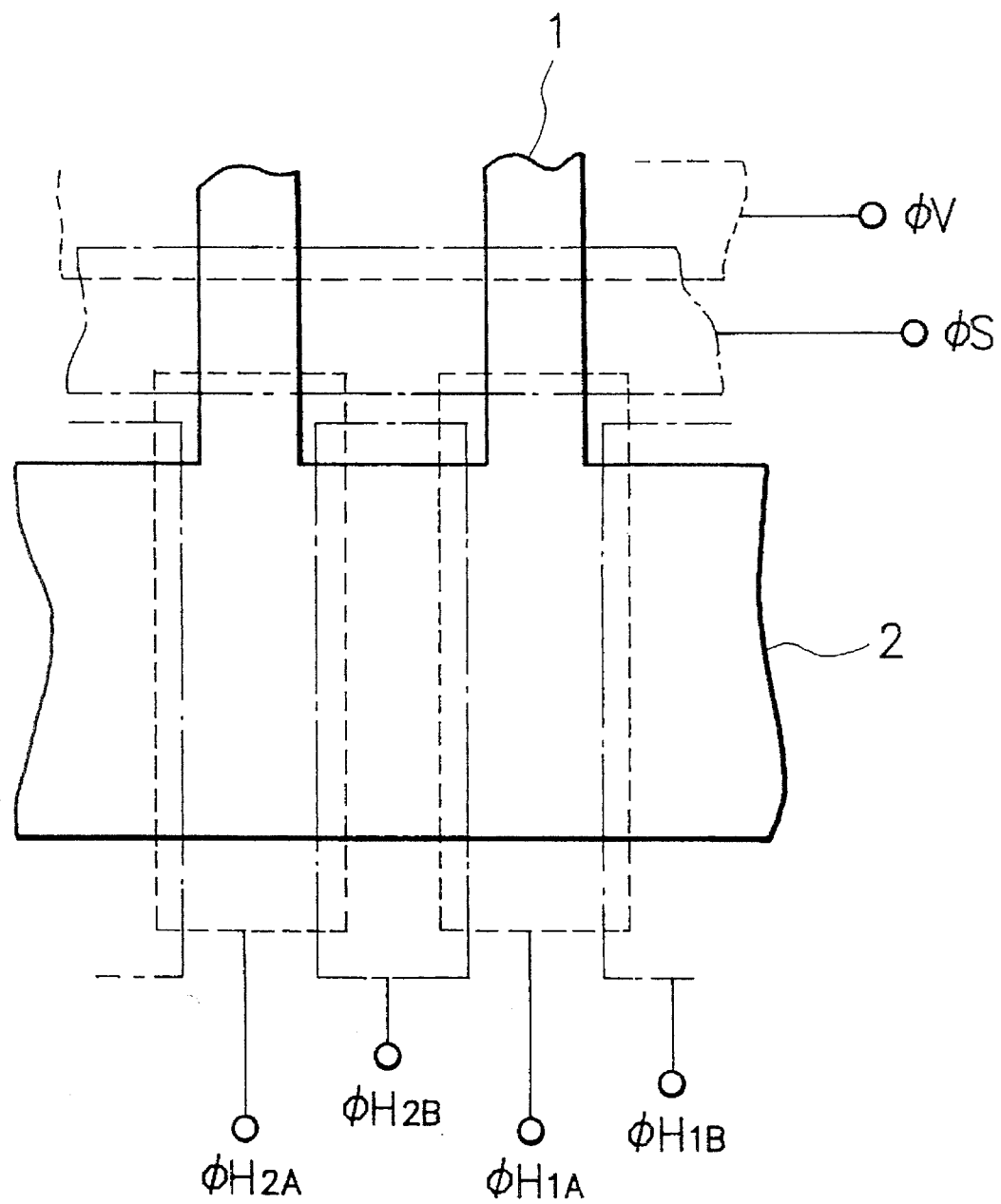
FIG. 7 is a schematic view showing horizontal transfer registers shown in FIG. 5.

FIG. 7 shows one embodiment of the horizontal transfer registers for summing the pixels in the present invention. A horizontal transfer register electrode is composed of four electrodes such as ΦH1A, ΦH1B, ΦH2A and ΦH2B, and the electrodes ΦH1B and ΦH2B act as the barriers for the electrodes ΦH1A and ΦH2A, and a two-phase drive of the electrodes ΦH1B and ΦH2B can be possible. Further, a storage electrode ΦS is provided at the final stage of the vertical transfer registers and is biased so as to permit the transferring of the charges only when the electrodes ΦH1A and ΦH2A have a high level.

A vertical transfer register electrode ΦV of the vertical transfer registers 1, the storage electrodes ΦS and the horizontal transfer register electrodes ΦH2A, ΦH2B, ΦH1A and ΦH1B of the horizontal transfer registers 2 are coupled with a drive control circuit (not shown).

Next, the pixel summing operations will now be described with reference to FIGS. 8A and 8B. An addition of two pixels aligned in the vertical direction can readily be carried out by a four-phase drive of the vertical transfer registers 1 and thus the description thereof can be omitted for brevity.

Figure 8A:
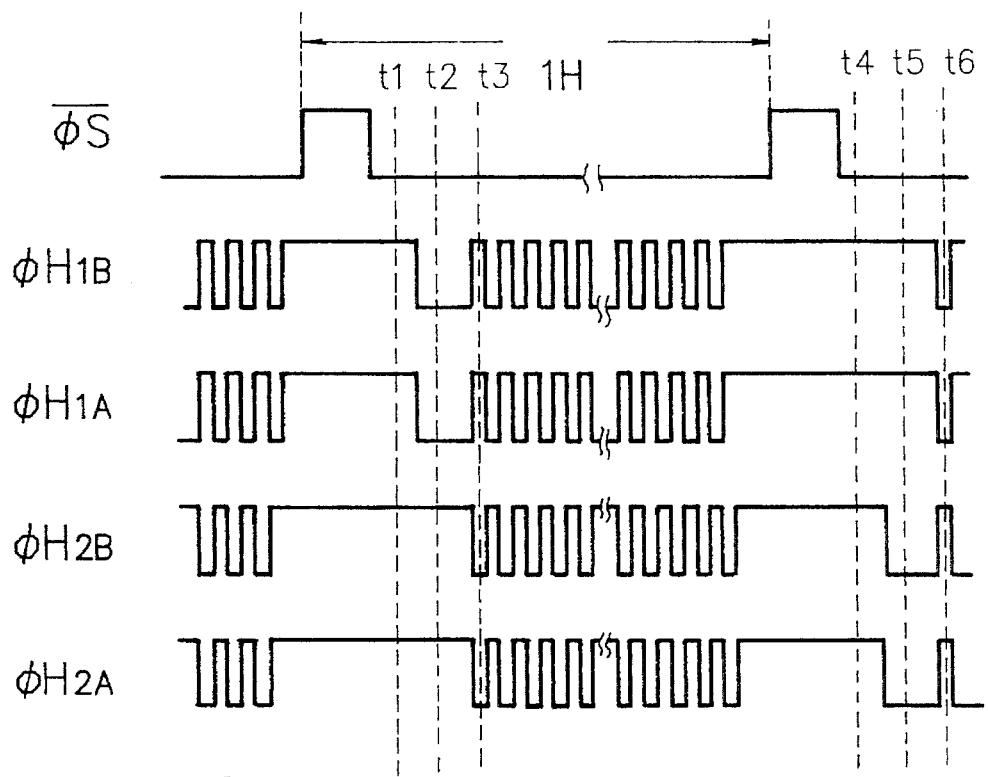
FIGS. 8A and 8B are timing charts showing pixel summing operations in the solid state image sensor shown in FIG. 5.
Figure 8B:
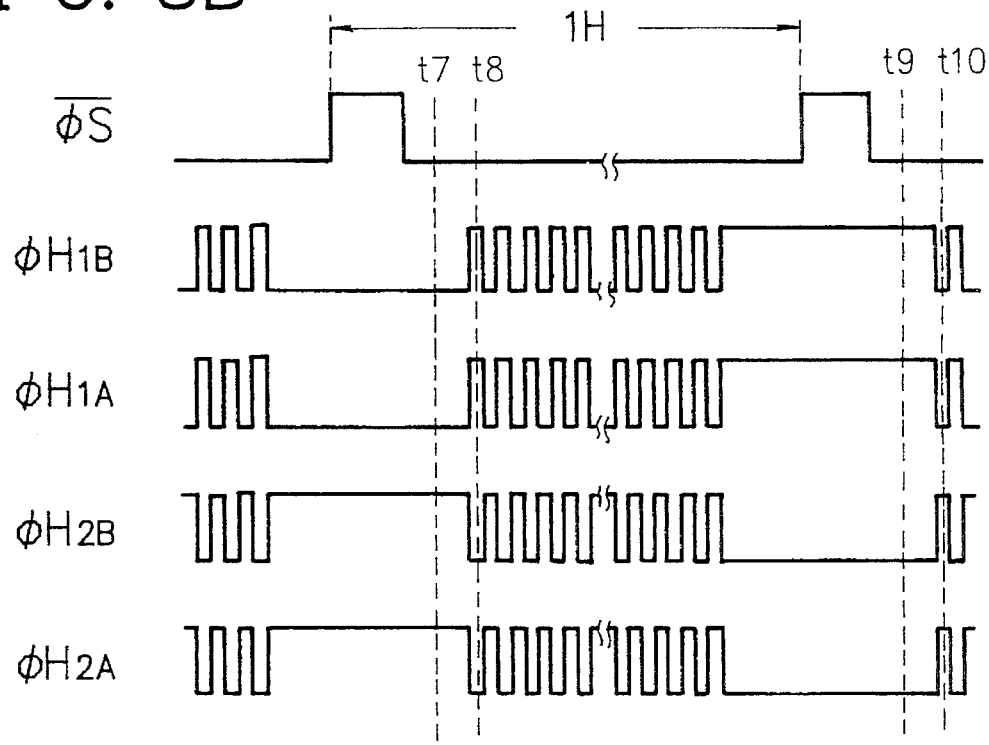

FIG. 8A illustrates a summing operation of charge addition results of each two pixels aligned in the vertical direction and the horizontal direction. In FIG. 8A, the charges of the pixels are transferred to the electrodes ΦH1A and ΦH2A at t1 and the charges of the ΦH1A are transferred to the ΦH2A at t2 to complete the summing operation. On the other hand, the charges of the ΦH2A are reversely transferred to the ΦH1A in the summing from t4 to t5 after one horizontal period to realize a line offset operation. Further, FIG. 8B shows a summing operation of the pixel charges in the vertical direction. Since the charges of the pixels are transferred to only the ΦH2A at t7 and to only the ΦH1A at t9, the transferred charges are summed at the storage electrode ΦS and simultaneously the line offset is carried out.

According to the present invention, the pixel charge summing method is not restricted to the one using the storage electrode ΦS and various modifications such as changing the shapes of the transfer register electrodes and using an additional readout electrode can be possible.

As described above, the present invention can be realized by a simple construction and a ready driving. Further, when the opening rate of the single device is determined to be at least 50%, although the MTF is somewhat reduced, it can be expected to permit a further increase of the sensitivity.

That is, according to the present invention, the photo diodes are driven so as to make the coincident mass centers $P_1$, $P_2$, $P_3$ and $P_4$. on the other hand, in the conventional imaging sensor, the driving operations of the photo diodes for the green color and of the photo diodes for the red/blue colors are the same and the obtained mass centers are deliberately offset, which is largely different from the present invention.

As described above, according to the present invention, in a solid state image sensor or imaging method wherein arrays of photoelectric conversion elements such as photo diodes of a plurality of solid state imaging devices are spatially offset, by summing n bits (n≧2) of the photoelectric conversion elements of each solid state imaging device, one field of sampling points are set to 1/n of the number of the photoelectric conversion elements, and a sampling of the same number of points as the number of the photoelectric conversion elements is carried out in n fields. And mass centers of the summed n bits of the solid stage imaging devices are determined to the same point to obtain a luminance signal, and as a result, sensitivity and dynamic range can be improved without degrading resolution. Further, according to the present invention, the occurrence of the invalid area in the conventional case, as shown in FIG. 1 can be prevented and the system can be miniaturized.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A solid state image sensor, comprising:

a plurality of solid state imaging devices arranged in a matrix for green color and red/blue colors;

vertical transfer means for transferring charges output from the solid state imaging devices in a vertical direction;

summing means for transferring the charges transferred from the vertical transfer means in a horizontal direction and summing the transferred charges; and control means for controlling timings of the transferring and the summing of the vertical transfer means and the summing means, respectively, the control means controlling the vertical transfer means and the summing means so that a first mass center as a sampling point obtained by summing the charges of the solid state imaging devices for the green color is made to be coincident with a second mass center obtained by summing the charges of the solid state imaging devices for the red/blue colors.

2. The solid state image sensor as claimed in claim 1, wherein the vertical transfer means includes vertical transfer registers and the summing means includes horizontal transfer registers for transferring the charges output from the solid state imaging devices in the horizontal direction and summing the charges.

3. The solid state image sensor as claimed in claim 2, wherein the vertical transfer registers are of a four-phase drive and the horizontal transfer registers are of a two-phase drive, and wherein the vertical and horizontal transfer registers have four fields of summing combinations, and the control means controls the vertical transfer means and the summing means so that the summing of the charges for the green color of the solid state imaging devices aligned in continuous two positions of predetermined rows along first and third columns is executed and the summing of the charges for the red/blue colors of the solid state imaging devices aligned in continuous four positions of predetermined rows along a second column is executed.

4. The solid state image sensor as claimed in claim 2, wherein the vertical transfer registers are of a four-phase drive and the horizontal transfer registers are of a two-phase drive, and wherein the vertical and horizontal transfer registers have four fields of summing combinations, and the control means controls the vertical transfer means and the summing means so that the summing of the charges for the green color of the solid state imaging devices aligned in continuous four positions of predetermined rows along a second column is executed and the summing of the charges for the red/blue colors of the solid state imaging devices aligned in continuous two positions of predetermined rows along first and third columns is executed.

5. The solid state image sensor as claimed in claim 2, further comprising an output amplifier for outputting the summed charges.

6. An imaging method, comprising:

a photoelectric conversion step for detecting image information of an object to be imaged using a plurality of imaging devices arranged in a matrix for green color and red/blue colors to output a charge array of the imaging devices;

vertical transfer step for transferring the charge array obtained in the photoelectric conversion step in a vertical direction; and horizontal transfer summing step for transferring the charge array transferred from the vertical transfer means in a horizontal direction and summing the transferred charge array, wherein, by the vertical transfer step and the horizontal transfer summing step, a first mass center as a sampling point, obtained by summing the charges of the solid state imaging devices for the green color is made to be coincident with a second mass center obtained by summing the charges of the solid state imaging devices for the red/blue colors.

7. The imaging method as claimed in claim 6,, wherein the vertical transfer step and the horizontal transfer summing step have four fields of summing combinations, and wherein the summing of the charges for the green color of the solid state imaging devices aligned in continuous two positions of predetermined rows along first and third columns is executed and the summing of the charges for the red/blue colors of the solid state imaging devices aligned in continuous four positions of predetermined rows along a second column is executed.

8. The imaging method as claimed in claim 6, wherein the vertical transfer step and the horizontal transfer summing step have four fields of summing combinations, and wherein the summing of the charges for the green color of the solid state imaging devices aligned in continuous four positions of predetermined rows along a second column is executed and the summing of the charges for the red/blue colors of the solid state imaging devices aligned in continuous two positions of predetermined rows along first and third columns is executed.

* * * * *